(12) United States Patent
Thornton et al.

(10) Patent No.: US 6,197,187 B1
(45) Date of Patent: Mar. 6, 2001

(54) TREATMENT FOR CONTAMINATED MEDIA

(75) Inventors: Roy Fred Thornton; Andrew Philip Shapiro, both of Schenectady; Timothy Mark Sivavec, Clifton Park, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/310,314

(22) Filed: May 12, 1999

(51) Int. Cl.[7] .................................................. C02F 1/461
(52) U.S. Cl. ............................ 205/743; 205/766; 204/515
(58) Field of Search ................................. 205/743, 766, 205/770; 204/555, 515, 556, 519

(56) References Cited

U.S. PATENT DOCUMENTS

| | | |
|---|---|---|
| 5,074,986 | 12/1991 | Probstein et al. ..................... 204/130 |
| 5,120,414 | 6/1992 | Carson et al. ..................... 204/180.1 |
| 5,362,394 | 11/1994 | Blowes et al. ......................... 210/617 |
| 5,391,305 | 2/1995 | Haitko ................................... 210/757 |
| 5,398,756 | 3/1995 | Brodsky et al. ...................... 166/248 |
| 5,447,639 | 9/1995 | Sivavec ................................ 210/747 |
| 5,476,992 | 12/1995 | Ho et al. ............................... 588/204 |
| 5,510,033 | 4/1996 | Ensley et al. ......................... 210/611 |
| 5,614,077 | 3/1997 | Wittle et al. .......................... 205/704 |
| 5,750,036 | 5/1998 | Sivavec ................................ 210/747 |
| 5,861,090 | 1/1999 | Clarke et al. ......................... 205/688 |

OTHER PUBLICATIONS

"Electroosmotic Removal of Gasoline Hydrocarbons and TCE from Clay", by C.J. Bruell et al., Journal of Environ. Eng., vol. 118, No. 1, pp. 68–83 (1992), No Month Provided.
"Electroosmotic Contaminant—Removal Processes", by B.A. Segall et al., Journal of Environ. Eng., vol. 118, No. 1, pp. 84–100 (1992), No Month Provided.
"Phenol Removal from Kaolinite by Electrokinetics", by Y.B. Acar et al., Journal of Geotechnical Eng., vol. 118, No. 11, pp. 1837–52 (1992), No Month Provided.

Primary Examiner—Kathryn Gorgos
Assistant Examiner—Thomas H Parsons
(74) Attorney, Agent, or Firm—Noreen C. Johnson; Douglas E. Stoner

(57) ABSTRACT

A method for treating a contaminated media. The method comprises disposing electrodes at the contaminated media, injecting a salt-containing solution into contaminated media, applying an electric voltage between electrodes imposed peripherally to the region, forming ions from the salt-containing solution, and migrating the ions between the electrodes across the contaminated media. The ions of the salt-containing solution migrate into at least a portion of the contaminated media to treat the contaminated media.

12 Claims, 3 Drawing Sheets

TREATMENT FOR CONTAMINATED MEDIA

BACKGROUND OF THE INVENTION

1. Field of the Invention

The present invention relates to a method for treating contaminated media, including soils and groundwaters. In particular, the invention relates to treating soil that is contaminated with halogenated hydrocarbons, such as halogenated hydrocarbons in aqueous compositions.

2. Description of the Related Art

Halogenated hydrocarbons, such as chlorinated hydrocarbons, are also known as chlorinated solvents (hereinafter collectively referred to as "chlorinated solvents"). Halogenated hydrocarbons have low flammability and are fairly stable, both chemically and biologically. They are commonly used in industry as chemical carriers and solvents, paint removers, and cleaners. The cleaning applications typically include metal degreasing, circuit board cleaning, metal parts cleaning, and dry cleaning. Chlorinated solvents are also used as intermediates in chemical manufacturing and as carrier solvents for pesticides and herbicides.

Chlorinated solvents are stable compounds, are relatively toxic at low levels, and many chlorinated solvents have been classified as suspected or confirmed carcinogens. Chlorinated solvents are prevalent contaminants in groundwater and soil because of their widespread use and long-term stability. Groundwaters and soils have become contaminated by chlorinated solvents from various sources. These sources include, but are not limited to, disposal facilities, chemical spills, and leaking underground storage tanks. Chlorinated solvents also may be released to the environment through the use, loss, or disposal of a neat liquid, and alternatively through the use or disposal of wash and rinse waters containing residual solvents.

Movement and dispersion of chlorinated solvents in the subsurface soils and groundwaters vary depending on whether the solvents are released as a neat liquid or in a dissolved form. If released in a dissolved form, chlorinated solvent migration is governed largely by hydro-geological conditions and processes. The presence of solubilizing agents, such as soaps from wash waters, counteracts natural soil sorption-retardation mechanisms for chlorinated solvents, and enhances migration of the chlorinated solvents.

If chlorinated solvent is released as a neat liquid, the chlorinated solvent migrates through soil under the force of gravity. A portion of the chlorinated solvent is typically retained in soil pores. If sufficient chlorinated solvent is present in the soil, the soil pores become saturated. Additional chlorinated solvent continues to migrate in the soil until it encounters a physical barrier or a water table. If the chlorinated solvent encounters a water table, the chlorinated solvent disperses until it encounters, accumulates, and overcomes the water table's capillary forces. At this point, the chlorinated solvent, which has a greater density than water, penetrates the water table's surface. The chlorinated solvent migrates under the force of gravity until its amount has been diminished through sorption, or until the chlorinated solvent encounters an aquitard.

In recent years, soil and groundwater contamination by chlorinated solvents has become an environmental problem. Chlorinated ethylenes, such as trichloroethylene (TCE), tetrachloroethylene (commonly known as perchloroethylene (PCE)), and chlorinated ethanes, such as 1,1,1-trichloroethane (TCA), which have been used as degreasing agents in a variety of industrial applications, pose environmental problems. Even though chlorinated degreasing agent use was curtailed in 1976, improper storage and uncontrolled disposal practices have resulted in contamination. Due to the high water solubility of chlorinated solvents, for example about 1100 mg/L TCE at 25° C., chlorinated solvents are highly mobile in soils and aquifers, and should be removed before dispersing too far. Therefore, a treatment to remove chlorinated solvents from contaminated soil and groundwater is needed.

A pump-and-treat method is a proposed treatment method removing contaminants from contaminated groundwater. The treatment usually involves withdrawing contaminated water from a well, volatilizing the contaminants in an air stripping tower, and adsorbing vapor-phase contaminants into granular-activated-carbon (GAC). There are limitations to this pump-and-treat method. The method is relatively inefficient, and some sites can require treatment for extended periods of time.

Chlorinated solvents can be degraded into less harmful materials by a method commonly referred to as "reductive dechlorination," in which chlorine is replaced by hydrogen. The reductive dechlorination uses metallic, solid reaction elements, such as iron and zinc, to degrade chlorinated solvents and other organic compounds. For example, Gillham, U.S. Pat. No. 5,266,213, discloses feeding contaminated groundwater through a trench containing iron to degrade contaminants. The Gillham process is conducted under strict exclusion of oxygen and occurs over a long time period. The Gillham process often requires large amounts of iron for complete reaction. Furthermore, it is difficult to introduce large volumes of solid reaction material, such as iron, using the Gillham process at effective depths for in situ remediation.

Another process proposed for removing contaminants from contaminated media is soil vapor extraction. In this process, contaminated media, such as contaminated soil is removed from the its location and treated to remove contaminants and vapor. The soil vapor extraction process is labor extensive and often is inefficient as recalcitrant fractions of the contaminants remain in the soil. Further, the soil vapor extraction process, as well as the above-described pump-and-treat process, is very difficult to use in some soils. For example, neither of the soil vapor extraction process nor the pump-and-treat process, are particularly useful to treat contaminants in tight, clayey soils.

Therefore, a process that effectively treats contaminated media, such as contaminated soils and groundwaters, is needed. Further, a process that enables control of potential difference in response to contaminant content monitoring is needed.

SUMMARY OF THE INVENTION

The invention sets forth a method for treating a contaminated media. The method comprises disposing electrodes at the contaminated media, injecting a salt-containing solution into contaminated media, applying an electric voltage between electrodes imposed peripherally to the region, forming ions from the salt-containing solution, and migrating the ions between the electrodes across the contaminated media. The ions of the salt-containing solution migrate into at least a portion of the contaminated media to treat the contaminated media.

In another aspect, the invention sets forth a method for treating a contaminated media. The method comprises steps of determining a location of an iron(III)-bearing composition zone; disposing electrodes proximate the contaminated media, injecting a solution containing a sulfide salt proximate the zone, controlling an electric voltage between the electrodes and across the zone to migrate an ion of the sulfide salt to at least a portion of the contaminated media, wherein the sulfide salt reacts to produce a ferrous sulfide barrier zone, and controlling an electric voltage between electrodes to create a voltage gradient to cause electroosmotic movement of the contaminants through the contaminated media and to the barrier zone.

A further method of the invention comprises treating a contaminated media. This method includes disposing electrodes proximate the contaminated media, determining a region of low permeability in the contaminated media comprising contaminants, injecting a solution containing a remediating salt proximate the contaminated media, and controlling an electric voltage applied across the electrodes to cause an ion of the remediating salt to migrate to the contaminated media.

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

The invention comprises a method for controllably treating contaminated media, such as, but not limited to, at least one of contaminated soil and contaminated groundwater. The following description will refer to "contaminated media," and includes contaminated soil, contaminated groundwater, and combinations, mixtures, and suspensions thereof. Further, the description of the invention refers to contaminants as chlorinated solvents. The scope of the invention includes contaminants comprising chlorinated solvents, and also including but not limited to, chlorinated hydrocarbons; halogenated hydrocarbons; chlorinated ethylenes, such as trichloroethylene (TCE), tetrachloroethylene, commonly known as perchloroethylene (PCE); chlorinated ethanes, such as 1,1,1-trichloroethane (TCA); combinations and mixtures thereof.

Figure 1:
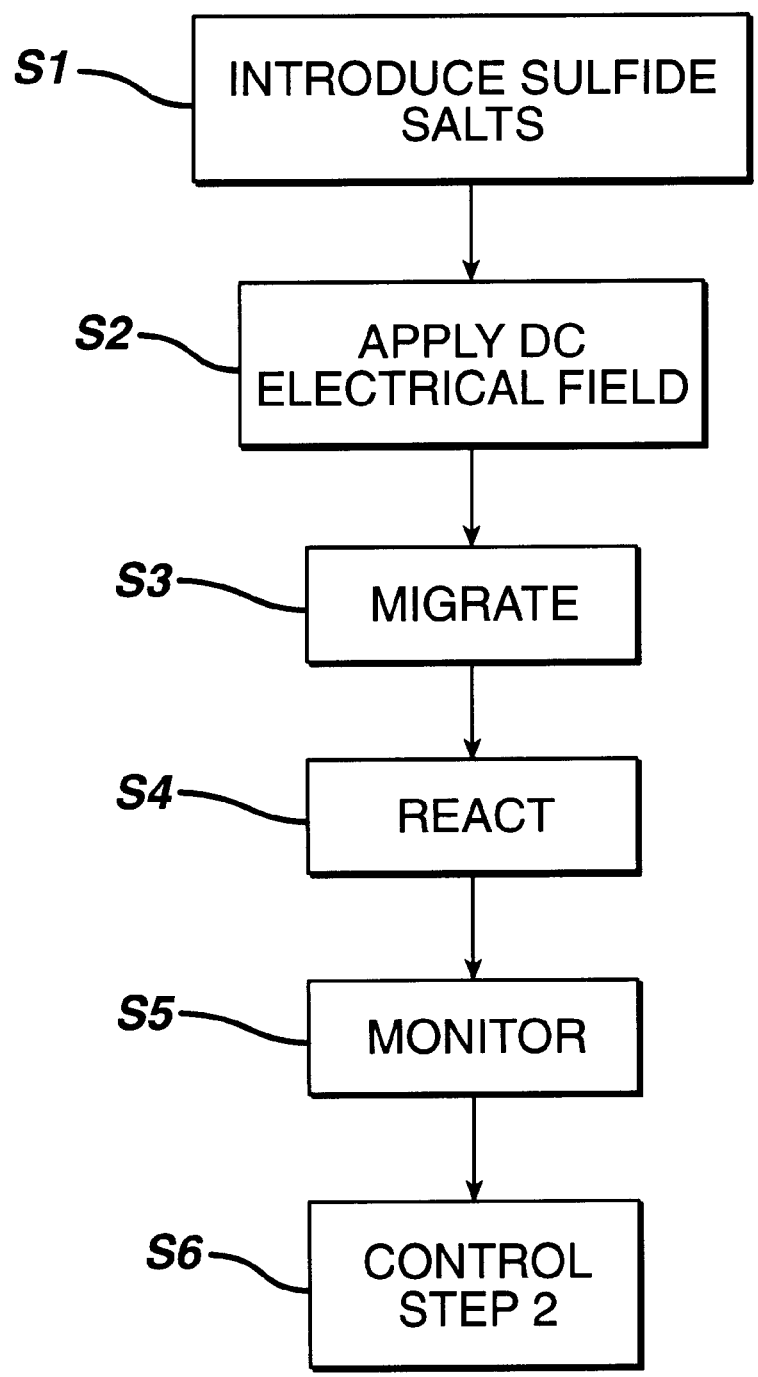
FIG. 1 is a flowchart of a treatment method according to the invention.

The treatment method, as embodied by the invention, comprises a series of steps, as illustrated in the flowchart of FIG. 1. The treatment method comprises introducing sulfide salts into contaminated media, in step S1. The sulfide salts are introduced to treat contaminants in the contaminated media. A controlled direct current electrical field (DC electrical field) is applied to the contaminated media in step S2 to form ions from the sulfide salts. The application of the DC electrical field causes migration of the introduced sulfide salts and their ions, in step S3. The ions comprise at least one of sulfide ions and bisulfide ions (hereinafter collectively referred to as remediating-sulfide ions). The remediating-sulfide ions react with iron(III) found in the contaminated media in step S4. The reaction of the sulfide ion and iron(III) also precipitates ferrous sulfides in the contaminated media. The precipitated-ferrous sulfides form a ferrous-sulfide zone, which can be used for further contaminant treatment steps. The process is monitored for contaminant content in step S5. The monitored contaminant content amount is used to control application of the electrical field control in step S6. Therefore, the potential difference from the DC electrical filed is controlled in response to the contaminant content monitoring.

The sulfide salts are introduced into the contaminated media in step S1 from an "injection well." The injection well can also function as an electrode of the electrode set that applies the DC electrical field, either as an anode or cathode. The injection well is disposed and positioned vertically opposite at least one vertically oriented oppositely-charged electrode. Alternatively, the injection well is horizontally disposed and positioned over or under at least one electrode. Combinations of electrodes used for the process are within the scope of the invention.

The sulfide salts comprise sulfide salts provided in aqueous solutions. The sulfide salts comprise at least one of sodium sulfide and sodium bisulfide. The sulfide salts, as embodied by the invention, comprise a sulfide selected from at least one of sodium bisulfide, sodium sulfide nonahydrate ($Na_2S\ 9H_2O$), sodium sulfide ($Na_2S$), sodium hydrogen sulfide, hydrogen sulfide, and ferrous sulfide, compounds, mixtures, and combinations thereof.

The sulfide salt is typically supplied at a cathode of the anode-cathode set. The anode-cathode set is a component of the DC electrical field creating system. The DC electrical field is created between electrodes of the DC electrical field creating system. The electrodes are emplaced proximate the contaminated media region. The term "proximate" means in, at, near, or around the contaminated media so that an electrical field created between the electrodes is able to effect fields within the contaminated media, and "emplaced" means that the electrodes are disposed in the contaminated media region, around the contaminated media region, and combinations thereof. The electrodes comprise at least one anode and at least one cathode.

The application of the DC electrical field to the contaminated media in step S2 is controlled in response to the monitored contaminant content in step S6 (as described hereinafter). The application of the DC electrical field ionizes the sulfide salts. The ionization forms at least one ionized reducing (remediating) agent and remediating ions (hereinafter collectively "remediating-sulfide ions") in the contaminated media. The remediating-sulfide ions are formed by reactions of contaminants in the contaminated media with ionized sulfide salts, for example under the influence of the DC electrical field.

The DC electrical field migrates the remediating-sulfide ions in step S3 to contaminated media regions in the contaminated media. These contaminated media regions include regions that are typically un-treatable by conventional contaminant treatment methods. For example, conventional hydraulic pumping treatment methods may not provide sufficient movement of treatment materials to hard to reach contaminated media regions, such as areas of low permeability. The migration of the remediating-sulfide ions, as embodied by the invention, causes the remediating-sulfide ions to reach and treat contaminated media regions of low permeability.

The remediating-sulfide ions migrate under the control of the DC electrical field and contact materials in the contaminated media. These materials in the contaminated media include, but are not limited to, chlorinated solvents, water, organic material, and inorganic materials found in the soil of contaminated media. For example, the contaminated media may include iron(III) minerals and iron(III)-containing materials in an iron-containing zone. The remediating-sulfide ions contact the iron-containing zone, react therewith, and reduce iron(III)-containing minerals to iron (II) minerals and iron(II)-remediating ions in step S4. Also, the remediating-sulfide ions combine with iron(II) to form bulk-reductant ferrous sulfide. The bulk-reductant ferrous sulfide aids in the treatment of contaminated media, for example aids in the reductive dechlorination of chlorinated solvents, as embodied by the invention.

Alternatively, the remediating-sulfide ions migrate into iron(III)-containing soil and react therewith to form a ferrous-sulfide zone. The ferrous-sulfide zone can act as a barrier in the contaminated media to confine migrating contaminated aqueous compositions. The ferrous-sulfide zone acts as a barrier in the contaminated media to define a treatment zone. When defining a treatment zone, a further DC electrical field can be applied to the defined-treatment zone and cause contaminated media, for example contaminated water, to move by electroosmosis. If electroosmosis in the contaminated media is limited, for example due to high impermeability in the contaminated media, the ferrous-sulfide region serves as a permeable barrier (perimeter) for the treatment's control. Electroosmosis is the movement of water in a soil matrix resulting from an electric field.

The application of the potential difference, in step S2, causes the ions to migrate and contact contaminants in the contaminated media. This migration is an electrokinetic process called "electromigration." Electromigration means the movement of ionic matter in a matrix toward an electrode of opposite charge when a constant, low DC electrical current is applied to electrodes. Electroosmosis and electromigration are known processes to those of ordinary skill in the art.

In applications involving relatively high permeability soils, the migration in step S3 also supplies additional reducing agents to treat the contaminated media, for example chlorinated solvents in the contaminated media. These additional reducing agents include, but are not limited to, organic acids, thiosulfate, metabisulfite, hypophosphite and ammonium ion.

Contaminated material content in the contaminated media is monitored and measured in step S5 to determine progress of the treatment process. This step is conducted by conventional monitoring and determining processes. The conventional monitoring and determining processes include, but are not limited to, steps of taking an initial sampling of the contaminated media region and determining a baseline contaminant level. The monitoring can include periodic monitoring of the contaminant level during the treatment method to determine its progress.

The treatment method is controlled in step S6 by comparing the monitored-contaminant level to the baseline contaminant content. This comparison determines the extent of operation of the method, and is used to control the potential difference applied by the DC electrical field. The control of the potential difference comprises at least one of increasing, redirecting, and terminating the application of the DC electrical field, and thus its potential difference.

Figure 2:
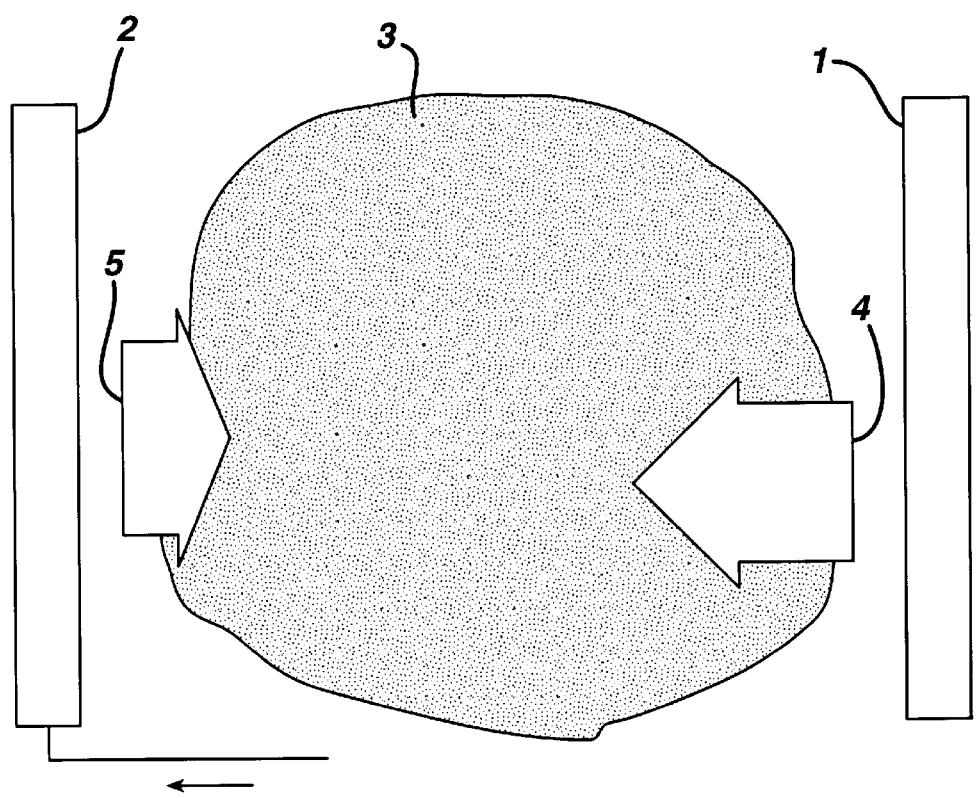
FIG. 2 is a schematic illustration of a method for migrating an ion into at least a portion of a region.

FIG. 2 is a schematic illustration of a system that employs the treatment method, as embodied by the invention. In FIG. 2, an electrode set comprises a cathode 1 and anode 2 (also known in the art as "cathode wells" and "anode wells, respectively), each of which are emplaced at the contaminated media. The electrode set is emplaced at the contaminated media at a contaminated media region 3. Cathode 1 comprises a single cathode, and alternatively comprises a plurality of cathodes. Similarly, anode 2 comprises a single anode, and alternatively, comprises a plurality of anodes.

Contaminated media region 3 comprises an iron(III)-containing aquifer, clay, clay-bearing soil, or sediment. The location of the iron(III)-containing aquifer, clay, clay bearing soil or sediment in the contaminated media is initially determined by sampling or other methods known in the art. The initial location determination will also permit determination of a contaminant content amount (baseline) for use in the controlling step of the invention.

A sulfide salt is injected into the contaminated media region 3 (step S1). For example, but in no way limiting of the invention, the sulfide salts are provided in an aqueous solution of sulfide salt, such as sodium sulfide or sodium bisulfide. An electric current is applied between the cathode 1 and anode 2 to form a DC electrical field (step S2). The DC electrical field forms sulfide ($S^{-2}$) ions in the contaminated media region 3. The DC electrical field typically comprises a voltage in a range between about 0.1 volts/cm and about 10 volts/cm.

Upon application of the electric current, sulfide ions migrate (step S3). across the contaminated media region 3, in the direction of arrow 4, from the cathode. The sulfide ions react with and reduce iron(III)-containing minerals in the contaminated media region 3 to iron(II) minerals (step S4).

The controlled DC electrical field that is applied between the cathode 1 and anode 2 migrates the remediating-sulfide ions and causes any contaminated water in or proximate the contaminated media region 3 to migrate (arrow 5) by electroosmosis. The iron(II) minerals effectively reduce contaminates, for example chlorinated solvents in the contaminated media region 3, including those that are migrated into contaminated media region 3 by the electroosmotic force. Also, the remediating-sulfide ions react with iron(III)-containing soil in contaminated media region 3 to form a ferrous-sulfide deposit. The ferrous-sulfide in the deposit reacts with and degrades chlorinated aliphatic compounds in the contaminated media.

The system as illustrated in FIG. 1 is merely exemplary of systems within the scope of the invention. For example, the treatment method, as embodied by the invention, is applicable to control processes wherein a dissolved, ionic-remediating component can be transported for treatment of a contaminated media. The treatment process, as embodied by the invention, is usable in the so-called "Lasagna" process, which incorporates a plurality of treatment zones to destroy or adsorb contaminants between emplaced electrodes. Examples of Lasagna process systems are disclosed by Brodsky et al., U.S. Pat. No. 5,398,756 and Ho et al., U.S. Pat. No. 5,476,992.

A "Lasagna" process typically comprises forming at least one liquid permeable region within a contaminated soil region, introducing material for treating contaminants in the contaminated soil region into the liquid permeable region to form at least one treating zone within the contaminated soil region, and transmitting direct electric current through the contaminated soil region between oppositely charged electrodes. A first electrode is located at a first end of the contaminated soil region and the second electrode is located at the opposite end of the contaminated soil region. Thus, an electroosmotic flow of material in the contaminated soil region, from the second to the first electrode, is established.

Figure 3:
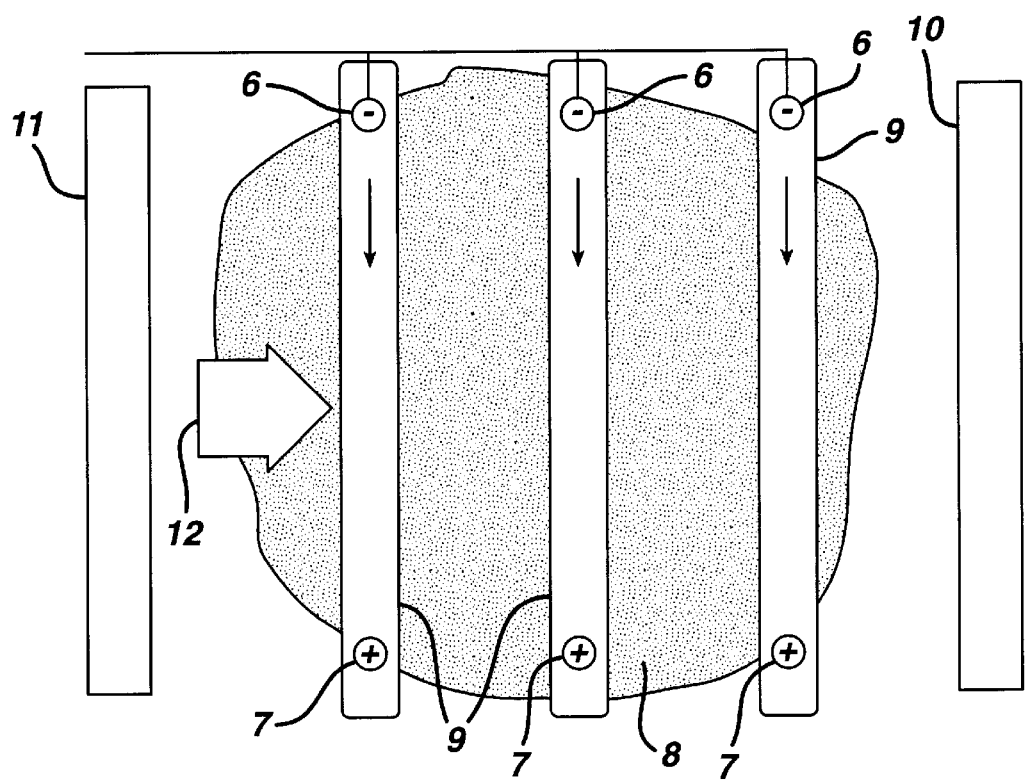
FIG. 3 is a schematic illustration of a method of forming treatment zones.

A portion of the "Lasagna" process cost involves the installation and material costs of the treatment zones. The treatment process, as embodied by the invention, forms treatment zones that reduce costs associated with the installation and materials in the when the "Lasagna" process. FIG. 3 illustrates an exemplary "Lasagna" system that relies upon multiple regions and zones that are common in a Lasagna process. The system comprises an electrode set, which includes pairs of cathodes 6 and anodes 7. The electrode set is emplaced in an opposing relationship in contaminated media, for example across a permeable reaction region 8. A remediating salt, as embodied by the invention, is injected into the permeable reaction region 8, for example proximate each cathode 6. The permeable reaction region 8 can comprise aquifer materials, soils, sediments, clay minerals containing iron (III) or with iron (III)-containing minerals, which include, but are not limited to, magnetite, goethite, hematite, maghemite, ferihydrite, and lepidocricite.

The injected remediating salt can comprise a sulfide, as discussed above. A DC electrical field is applied across the electrode set, and causes negative ions to migrate from the cathode and positive ions to migrate from the anode into the permeable reaction region 8. The positive and negative ions form barrier zones 9. The electrode set also comprises electrodes 10 and 11 that apply a DC electrical field across the permeable reaction region 8. The electrodes 10 and 11 are typically oriented to be substantially perpendicular to the barrier zones 9. Thus, the electrodes 10 and 11 cause contaminated water in the contaminated media to migrate in the direction of arrow 12 through the barrier zones 9 for treatment in accordance with the "Lasagna" process.

The contaminated media treatment, as embodied by the invention, comprises an in situ treatment of chlorinated solvents, including but not limited to, halogenated contaminants adsorbed in contaminated media. Adsorbed contaminants are capable of slowly leaching into the aquifer even after the aquifer ground water has been treated. Contaminated media, including but not limited to, ground water and soils, can be treated by the process, resulting in substantial saving of time and expense.

The treatment method, as embodied by the invention, relates to methods for treating contaminated media, such as, but not limited to, aqueous compositions, to remove and destroy contaminants. The term "aqueous composition" includes water environments, for example natural water environments including aquifers, particularly groundwater and other subsurface environments, pond and stream sediments, and dampened soil.

The treatment method, as embodied by the invention, can be applied to treatment of water contaminated with a variety of water miscible or soluble halogenated organic compounds. Chlorinated solvent is a particularly common contaminant in aquifers and other subsurface water containing environments. TCE, DCE, VC, tetrachloroethylene, dichloroethane, trichloroethane, carbon tetrachloride, chloroform and dichloromethane are illustrative examples of contaminants. Other halogenated hydrocarbon compounds that may be treated, by the treatment method as embodied by the invention, include chloroethane, methyl chloride, brominated methanes, brominated ethanes, brominated ethenes, fluorinated methanes, fluorinated ethanes, fluorinated ethenes, fluorochloromethanes, fluorochloroethanes and fluorochloroethenes. The degradation of chlorinated solvents may occur by a reductive dechlorination mechanism in which carbon-chlorine bond reduction is coupled to the oxidation of Fe(II) to Fe(III) at the clay-bound ferrous-water interface. The process of the invention fully reduces TCE, DCE and VC to ethene, ethane, ethyne and chloride. Significantly lower concentrations of C3, C4, C5, and C6 hydrocarbons are also generated. Exemplary iron(III)-containing minerals include magnetite, goethite, hematite, maghemite, ferihydrite and lepidocricite. Natural hydraulic gradients then transport the organic contaminants to the modified clay zones where degradation of the contaminants occurs.

The electrode set includes at least one anode and cathode, either or both of which comprise an iron-containing material. For example, an anode is formed as an iron anode. As used herein, the term "cathode" and the term "anode" are used in the singular, however the terms can mean a single electrode or a plurality of electrodes. The electrodes are disposed at approximately the same plane or level, for example, the same horizontal, vertical, or diagonal level. The levels depend on whether the contaminated-media treatment zone is disposed vertically, horizontally, or diagonally with respect to a contaminated media surface. Electrical connections, electrode sizes, and electrode materials for the electrodes include varying specifications depending on each treatment. For example, the electrodes may comprise carbon, in addition to iron, since carbon is a corrosion resistant material, in which carbon aids in pH buffering of the treatment method.

The electrodes may also comprise at least one of porous and perforated structures, each of which permits ingress and egress of liquid, for example groundwater. Alternatively, the electrodes are located within a perforated container, which is disposed in the contaminated media. A further alternative comprises electrodes that are disposed behind a liquid permeable barrier in the contaminated media.

The treatment method, as embodied by the invention, permits treatment methods for enhanced remediation of contaminated aqueous solutions contaminated with chlorinated aliphatic hydrocarbons, such as those disclosed by Sivavec, U.S. Pat. No. 5,447,639 to Sivavec, the entire contents of which are incorporated herein. Thus the treatment method can react and reduce chlorinated hydrocarbons with ferrous sulfide to generate innocuous byproducts, such as ethane, ethene, and chloride ion ($Cl^{-1}$). Chlorinated aliphatic hydrocarbons, including trichloroethylene (TCE), tetrachloroethylene, and chlorinated ethanes, such as 1,1,1-trichloroethane, are able to be reduced to ethene, ethane, and chloride ion when contacted with iron (II) sulfide, for example under aerobic or anaerobic conditions. The reaction may proceed, in situ or ex situ, by an electron transfer mechanism at the mineral-water interface wherein ferrous ion ($Fe^{+2}$) and/or sulfide in ferrous sulfide function as reducing agents and are oxidized to ferric ion ($Fe^{+3}$) sulfate ($SO_4^{-2}$) respectively. Examples of ferrous ion sources include iron(II) sulfate heptahydrate and the reductive dissociation product of magnetite, $Fe_3O_4$, and oxalic acid.

The treatment method of the invention also provides reductive dehalogenation of halogenated solvents by contact with sulfide modified aquifer materials, soils, sediments, clay minerals containing iron (III) or with iron (III)-containing minerals including magnetite, goethite, hematite, maghemite, ferihydrite and lepidocricite. Sulfide reductive dehalogenation in the presence of iron may proceed according to two mechanisms: (1) the sulfide acts as a reductant to reduce iron(III)-containing minerals such as magnetite, goethite and lepidocricite to iron(II); and (2) the sulfide mineralizes with iron(II) to generate ferrous sulfide.

While various embodiments are described herein, it will be appreciated from the specification that various combinations of elements, variations or improvements therein may be made by those skilled in the art, and are within the scope of the invention.

What is claimed:

1. A method for in situ decontamination of a halogenated hydrocarbon contaminated media by reductive dehalogenation, the method comprising:
   disposing electrodes peripherally at the contaminated media;
   injecting a sulfide salt-containing aqueous solution into the contaminated media;
   applying an electric voltage between the electrodes disposed to the contaminated media,
   forming ions from the salt-containing solution; and
   migrating the ions between the electrodes across the contaminated media to cause ions of the sulfide salt-containing solution to migrate into at least a portion of the contaminated media to dehalogenate the halogenated hydrocarbon in the contaminated media.

2. The method of claim 1, wherein the salt-containing solution comprises a sulfide, the contaminated media comprises an iron(III)-bearing composition, the method further comprising the steps of:
   reacting the ions with the iron(III)-bearing composition to produce iron (II) remediating ions or a ferrous-sulfide zone,
   reacting the ions to produce iron(II) remediating ions; and
   applying an electric current to migrate contaminants in the contaminated media to the zone for treatment.

3. The method of claim 1, the electrodes comprising at least one anode and at least one cathode, the method further comprising the step of injecting a reducing agent at a cathode, and migrating the reducing agent to the zone for treatment of the contaminated media.

4. The method of claim 3, wherein the reducing agent is an organic acid, thiosulfate, metabisulfite, hypophosphite, or ammonium ion.

5. The method of claim 1, wherein the step of injecting a salt-containing solution into contaminated media comprises injecting the salt-containing solution at an injection well.

6. The method of claim 1, wherein the salt-containing solution comprises sodium sulfide, sodium bisulfide, sodium sulfide nonahydrate ($Na_2S\ 9H_2O$), sodium sulfide ($Na_2S$), sodium hydrogen sulfide, hydrogen sulfide, or ferrous sulfide.

7. The method of claim 1, wherein the contaminated media comprises an aquifer.

8. The method of claim 1, wherein the contaminated media comprises a chlorinated hydrocarbon.

9. A method for decontamination of halogenated hydrocarbon contaminated media by reductive dehalogenation of the halogenated hydrocarbon, the method comprising:
   determining a location of an iron(III)-bearing composition zone;
   emplacing electrodes proximate the contaminated media;
   injecting a solution containing a sulfide salt proximate the zone;
   controlling an electric voltage between the electrodes and across the zone to migrate an ion of the sulfide salt to at least a portion of the contaminated media, wherein the sulfide salt reacts to produce a ferrous sulfide barrier zone; and
   controlling an electric voltage between electrodes to create a voltage gradient to cause electroosmotic movement of the contaminants through the contaminated media and to the barrier zone for treatment.

10. The method of claim 9, wherein the sulfide salt is sodium bisulfide, sodium sulfide nonahydrate ($Na_2S\ 9H_2O$), sodium sulfide ($Na_2S$), sodium hydrogen sulfide, hydrogen sulfide, or ferrous sulfide.

11. The method of claim 9, wherein the contaminated media comprises an aquifer.

12. A method of treatment for decontamination by reductive dehalogenation of halogenated hydrocarbon contaminated media, the method comprising:
   disposing electrodes proximate the contaminated media;
   determining a region of low permeability in the contaminated media;
   injecting a solution containing a remediating salt selected from the group consisting of sodium sulfide, sodium bisulfide, sodium sulfide nonahydrate ($Na_2S\ 9H_2O$, sodium sulfide ($Na_2S$), sodium hydrogen sulfide, hydrogen sulfide, or ferrous sulfide proximate the contaminated media; and
   controlling an electric voltage applied across the electrodes to cause ions of the remediating salt to migrate to the contaminated media.

* * * * *